United States Patent
Chen et al.

(10) Patent No.: US 7,559,021 B2
(45) Date of Patent: Jul. 7, 2009

(54) FOLDING TEXT

(75) Inventors: Yen Fu Chen, Austin, TX (US); John H. Handy-Bosma, Cedar Park, TX (US); Mei Y. Selvage, Austin, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 11/039,732

(22) Filed: Jan. 20, 2005

(65) Prior Publication Data

US 2006/0161842 A1     Jul. 20, 2006

(51) Int. Cl.
G06F 17/00 (2006.01)
G06F 15/16 (2006.01)

(52) U.S. Cl. .................. 715/243; 709/204; 715/254

(58) Field of Classification Search ......... 709/204–206; 715/230–233, 243–254, 273, 277, 705, 715, 715/764, 781, 789, 795, 256, 261, 732–734, 715/748, 751–760, 864, 866
See application file for complete search history.

(56) References Cited

U.S. PATENT DOCUMENTS

| | | | |
|---|---|---|---|
| 5,442,742 A | 8/1995 | Greyson et al. | |
| 6,279,017 B1 | 8/2001 | Walker | |
| 6,557,027 B1 * | 4/2003 | Cragun | 709/204 |
| 6,683,631 B2 | 1/2004 | Carroll | |
| 6,772,195 B1 | 8/2004 | Hatlelid et al. | |
| 7,024,456 B1 * | 4/2006 | Simonoff | 709/205 |
| 7,124,164 B1 | 10/2006 | Chemtob | |
| 7,124,167 B1 * | 10/2006 | Bellotti et al. | 709/206 |
| 2003/0229845 A1 * | 12/2003 | Salesin et al. | 715/500 |
| 2004/0015547 A1 * | 1/2004 | Griffin et al. | 709/204 |
| 2004/0015553 A1 * | 1/2004 | Griffin et al. | 709/206 |
| 2004/0109023 A1 | 6/2004 | Tsuchiya | |
| 2004/0119740 A1 * | 6/2004 | Chang et al. | 345/751 |
| 2005/0102628 A1 * | 5/2005 | Salesin et al. | 715/764 |
| 2006/0161851 A1 | 7/2006 | Chen et al. | |

OTHER PUBLICATIONS

William Wright and Dana Moore, "Instant Messaging A Programmer's Tool? Jabber and lightweight languages do the trick," Dr. Dobb's Journal, pp. 48-53, Mar. 2004.

* cited by examiner

*Primary Examiner*—Paul H Kang
*Assistant Examiner*—Shirley X Zhang
(74) *Attorney, Agent, or Firm*—Stephen J. Walder, Jr.; Libby Z. Handelsman

(57) ABSTRACT

An example of a solution provided here comprises receiving a text definition signal, defining a first portion of text for folding, receiving a signal for hiding, and in response to the signal for hiding, displaying to at least one user a text view without the first portion, and a clue as to what is hidden.

5 Claims, 4 Drawing Sheets

FOLDING TEXT

CROSS-REFERENCE TO RELATED APPLICATION, AND COPYRIGHT NOTICE

The present patent application is related to a co-pending patent application entitled Folding Text in Side Conversations, filed on even date herewith, assigned to the assignee of the present patent application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling and digital communication, and more particularly to software, systems, and methods of messaging and collaboration.

BACKGROUND OF THE INVENTION

When collaborating on a project, it is often difficult to point others to the right place in a text, or to weed out irrelevant information. For example, consider the use of instant messaging (IM) applications as conference tools to discuss issues and share ideas or information. A large number of participants in an IM conference is not uncommon, the conference time can be lengthy, and many topics may be covered. As a consequence, IM transcripts often are lengthy. Since they are flat files that just simply log the conversations from beginning to end, lengthy transcripts cause the following difficulties for users. It becomes difficult to keep track of the conversation, or just the part that is relevant to a particular user. Full text search is an conventional option, but navigation after finding text can be difficult. It is often difficult to point others to the right place in a conversation. Users of conventional IM applications may look back at the previous transcript line by line, then cut and paste pertinent information into the IM window so other people know what they are referring to. This cut-and-paste approach diverts users' attention, and increases transcript volume, which makes it even harder to read and find information later on.

Thus there is a need for systems and methods that hide certain parts of a text (such as IM transcripts) to facilitate communication and organization.

SUMMARY OF THE INVENTION

An example of a solution to problems mentioned above comprises receiving a text definition signal, defining a first portion of text for folding, receiving a signal for hiding, and in response to the signal for hiding, displaying to at least one user a text view without the first portion, and a clue as to what is hidden.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Folding" means concealing or obscuring from the view of some users or all users.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
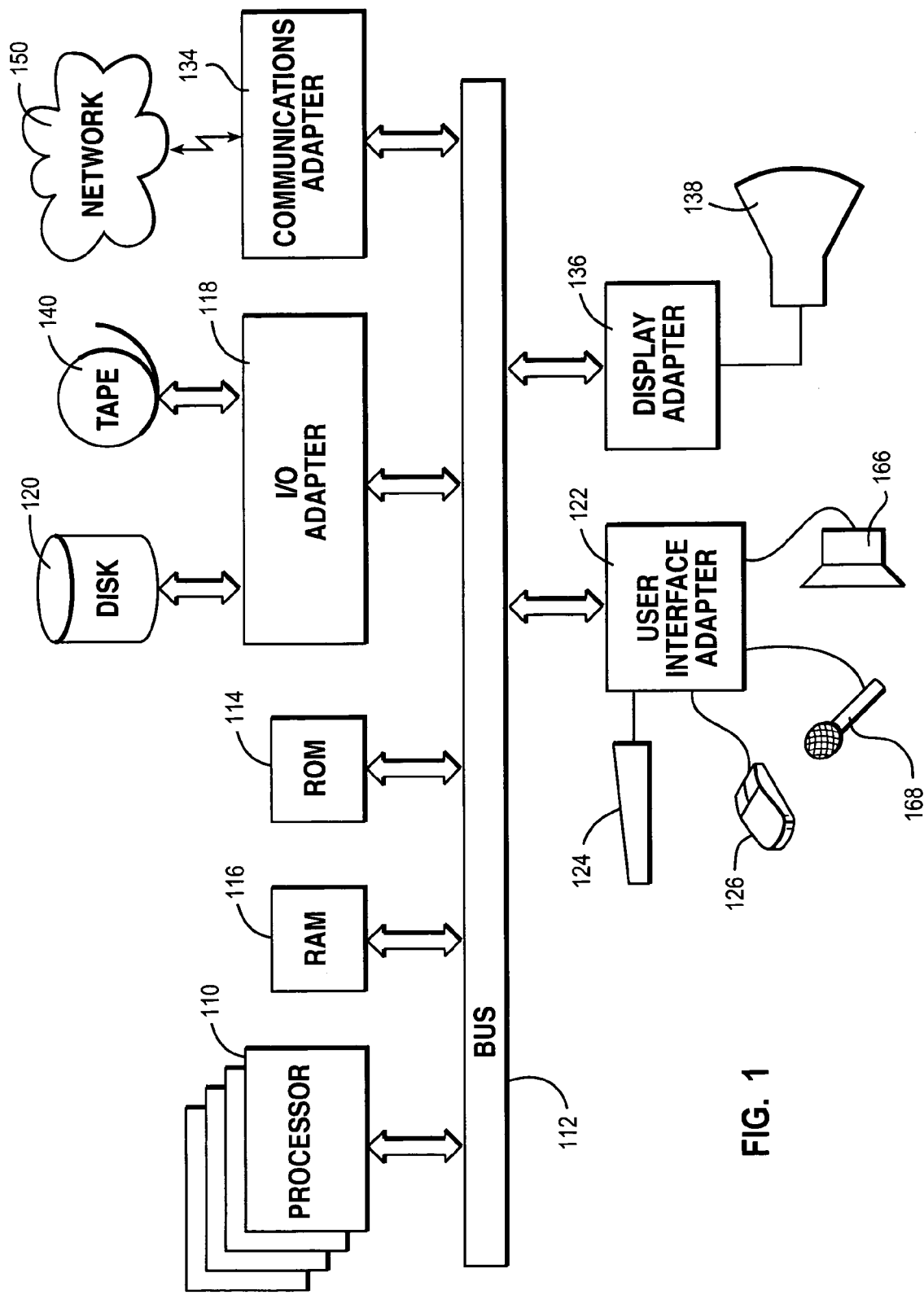
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2A:
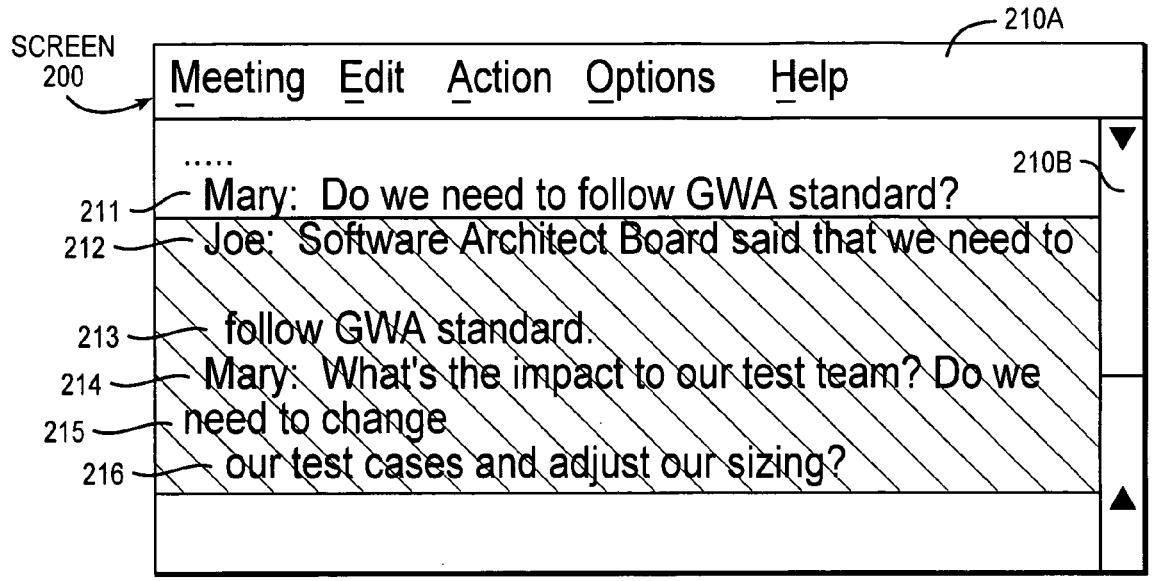
FIG. 2A shows an example of defining a portion of text for folding.
Figure 2B:
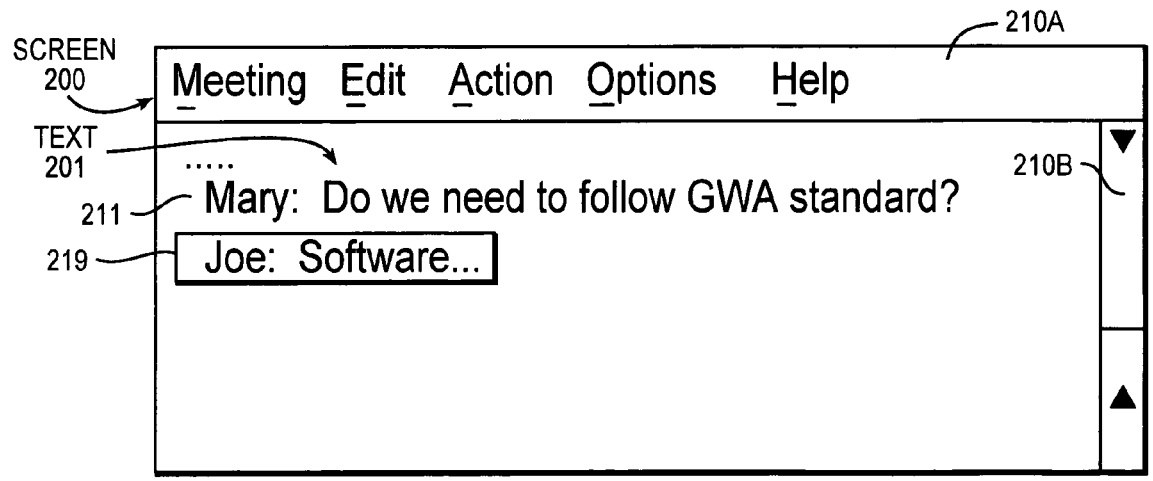
FIG. 2B shows a view after reversibly hiding a portion of text.

FIGS. 2A-2B illustrate examples of folding text, according to the teachings of the present invention. FIGS. 2A-2B each illustrate an example of a screen shot from a messaging application. FIGS. 2A-2B each illustrate screen 200, having a menu bar 210A and a scroll bar 210B. Screen 200 displays text (such as text at 201 in FIG. 2B). (In other scenarios, users of collaboration software may utilize an interface similar to screen 200, in working together on software code, a reusable component of web services, a transcript of a speech, a document, etc.) Here is an overview of major features illustrated in these examples in FIGS. 2A-2B:

- Users fold a certain portion of the text (to hide it), and reverse this by unfolding the text. Thus users can grasp overall information and allocate information quickly in lengthy transcripts, for example.
- Users share fold views. Users can easily refer to the portion of text they are talking about, by sharing fold views, during a conference (see FIG. 2B).
- Users define fold rules and save them in order to reuse these rules.
- Users define default folds, and let an IM application apply folding rules automatically.

Turning to details of the invention, FIG. 2A shows an example of defining a portion of text, lines 212-216, for folding. Then if the messaging application receives the signal for hiding, lines 212-216 are hidden (see FIG. 2B).

FIG. 2B shows a view after reversibly hiding a portion of text (lines 212-216, that are visible in FIG. 2A). This view may be created under the control of one user, and shared with other participants in a conference. A button 219 may give a clue as to what has been folded or hidden.

Users hide certain portions of the text in folds, and reverse this by opening the folds. Users are able to select a section of text and issue a command or click a button to "fold" the text to a much smaller size. The folded text can be expanded by issuing a command or by clicking on it. Here is a use case to fold the text:

1. Users select a section of text (e.g. lines 212-216 that are visible in FIG. 2A) and issue a command, or click a button, or right click and choose a menu option to "fold" the text.
2. A button 219 (visible in FIG. 2B) showing the first words will appear, or a plus sign will show the folds, for example.
3. The IM client can be configured so the first few words appear next to a fold or on the button 219 so the user has a due of what has been hidden.
4. The fold clues (similar to button 219) can be customized, with different colors, images or shapes to reveal the priority, hierarchy orders, identities of people or other information, for example.

Here is a use case to unfold or open the folds:

1. Users issue a command to open, or click on a plus sign or button 219, or move a mouth symbol over the plus sign or button 219, for example.
2. The original text (e.g. lines 212-216 that are visible in FIG. 2A) will expand or unfold.
3. The IM client can be configured so that when a portion of text expands, other parts will fold automatically in order to provide a manageable overview.

Continuing with other aspects of the example in FIGS. 2A-2B, the "sharing" of a text fold view (such as the view in FIG. 2B) is a convenience mechanism to share the hiding of text. It is equivalent to views in a database analogy. It allows users to define fold views and share these views with others. The benefits are allowing different users to see a common fold view, highlighting the important parts, obscuring the part that is distracting, and facilitating the communication. This aspect of the invention is synchronization of fold views, with another IM client, or in an IM meeting as well. Synchronizing the IM meeting fold views means that all the IM clients participating in the IM meeting see one common fold view (such as the view in FIG. 2B). Preferably, the moderator controls the IM and the folding in the e-meeting, or allows others to do the folding. For example, user A is the moderator of an e-meeting, and user B is the presenter in the e-meeting. User A grants user B the synchronization right. User B wants everyone focus on one portion of text (e.g. line 211 in FIGS. 2A-2B), so he hides the rest and defines a fold view. User B executes the commands or clicks the button, and everyone's e-Meeting display (e.g. screen 200 in FIG. 2B) will show User B's defined text view.

Continuing with other aspects of the example in FIGS. 2A-2B, consider defining folding rules (rules for defining a portion of text, such as lines 212-216, for folding), and saving them in order to reuse these rules.

- Users can define folds within or across folds, i.e., sub-folds and super-folds, on an ad-hoc basis.
- Folds can be defined at places where people say something as in a turn or sub-turn, where turns change, where topics change, where a session ends, where it begins again. Line numbers, timestamp, or names of people are also good criteria for folding. Last, folds can be defined for a previous conversation after a period of inactivity.
- Users can save the folding rules for a later usage. Users can issue a command to invoke a particular folding rule. For example, a user wants to fold all text prior to half an hour ago, so she selects an item from menu bar 210A, or types in a command and activates a predefined rule: "fold 30 minutes." The IM client will fold all text prior to half an hour earlier (i.e. an old portion of a message transcript). Preferably, the IM clients have the ability to turn on line numbers.

Next, consider default folds to let an IM application apply folding rules automatically. Users can define default folding rules. For example, an IM client will automatically fold the transcripts at turns, at topic changes, at names of people, or provide users the option of when to fold.

In summary, FIGS. 2A-2B illustrate an example where a messaging application receives a text definition signal, defining a portion of text (shaded lines 212-216), for folding. The messaging application receives the signal for hiding. FIG. 2B illustrates displaying to at least one user a text view without a selected portion (lines 212-216), and displaying a clue 219 as to what is hidden, in response to the signal for hiding. The example may be extended to include sharing with other conference participants a message transcript view (FIG. 2B), without the old portion of a message transcript that was selected for hiding. Thus information remaining (line 211) in the shared message transcript view may be emphasized.

Figure 3:
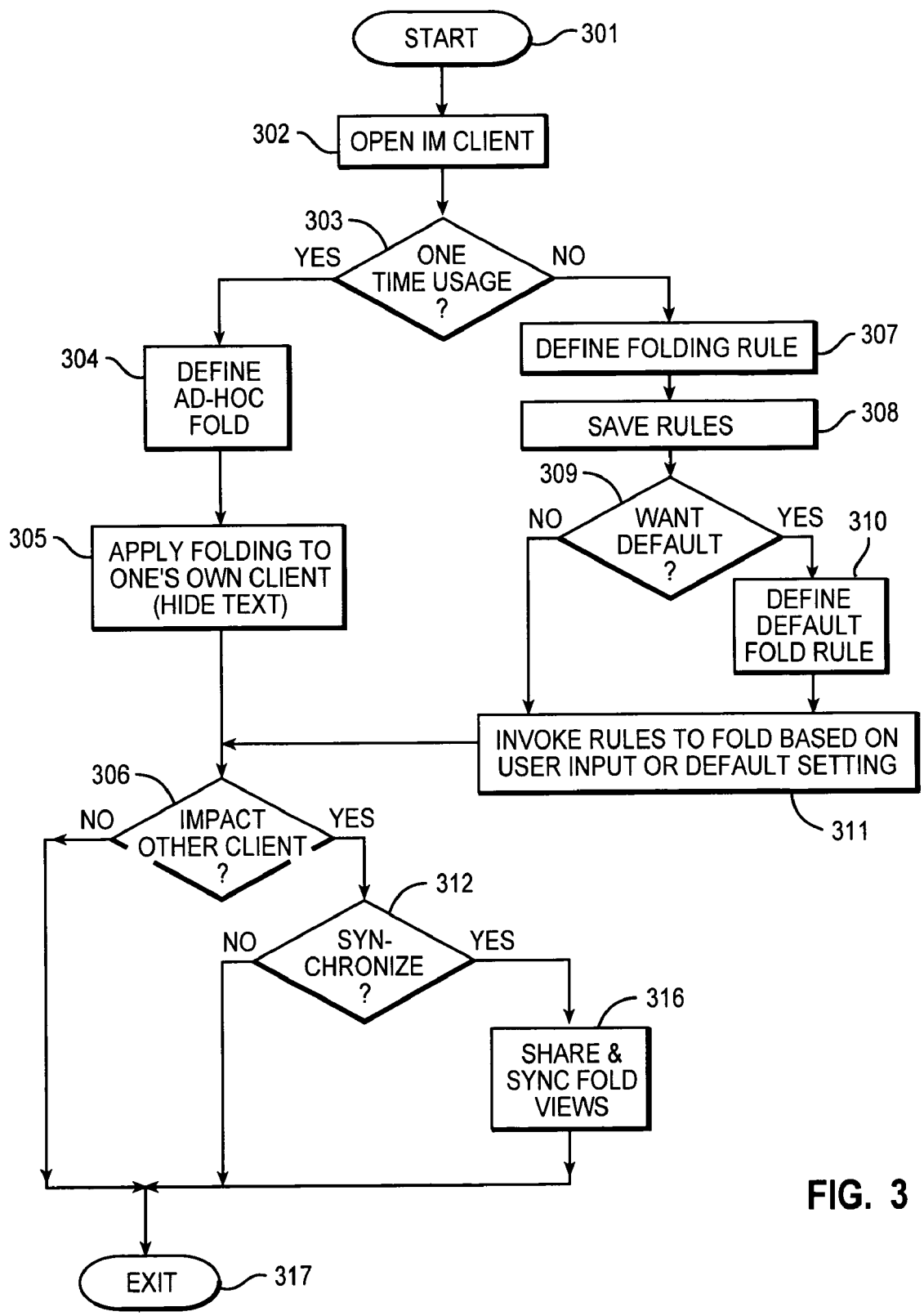
FIG. 3 is a flow chart illustrating an example of a communication method, according to the present invention.

FIG. 3 is a flow chart illustrating an example of a communication method, according to the present invention. The example starts at Block 301 and continues at Block 302 with opening an IM client. Decision 303 symbolizes the choice between one-time. usage, or operations that affect future usage of the tool. For one-time usage, at Decision 303 the "Yes" path is taken to Block 304. At Block 304, users can define folds on an ad-hoc basis. At Block 304, the messaging application receives the signal for defining a portion of text, for folding. At Block 305, the messaging application receives the signal for hiding, and folds a certain portion of the text (to hide it). Thus a user applies folding to one's own IM client. At Decision 306 the messaging application may receive a command to impact another client. If so, the "Yes" path is taken to Decision 312. For example, a user defines a fold view and shares this view with others (Block 316). On the other hand, if no command is received to impact another client, the "No" path is taken to end at Block 317.

At Decision 312, the messaging application may receive a signal to synchronize: in other words, define a fold view and share this view with others. If so, the "Yes" path is taken to 316. At Block 316 all the IM clients participating in the IM meeting display one common fold view. After operations at Block 316, the example ends at Block 317. On the other hand, if no command is received to synchronize, the "No" path is taken to end at Block 317.

Continuing with details of FIG. 3, at Decision 303, the "No" path may be taken to 307, to define folding rules, and to save them at Block 308 in order to reuse these rules (see also the description above in connection with FIGS. 2A-2B). At Block 307, the messaging application receives input to define a particular folding rule. For example, line numbers, timestamp, or names of people are good criteria for folding. At Block 308 the messaging application receives a command to save the folding rules for a later usage.

Decision 309 symbolizes the option to define default folding rules. At Block 310 users can define default folding rules. For example, an IM client will automatically fold the transcripts at turns, at topic changes, at names of people. On the other hand, from decision 309, the "No" path may be taken directly to 311. At Block 311 the messaging application receives a command to invoke a particular folding rule. For example, a user wants to fold all text prior to half an hour ago, so she types in a command and activates a predefined rule: "fold 30 minutes." The transcripts will fold all text prior to half an hour earlier. Or an IM application may apply default folding rules automatically, in the absence of a contrary command-from a user.

Regarding FIG. 3, the order of the operations described above may be varied. For example, putting Decision 306 ("Impact other client?") first is within the practice of the invention. Blocks in FIG. 3 could be arranged in a somewhat different order, but still describe the invention. Blocks could be added to the above-mentioned diagram to describe details, or optional features; some blocks could be subtracted to show a simplified example.

Figure 4:
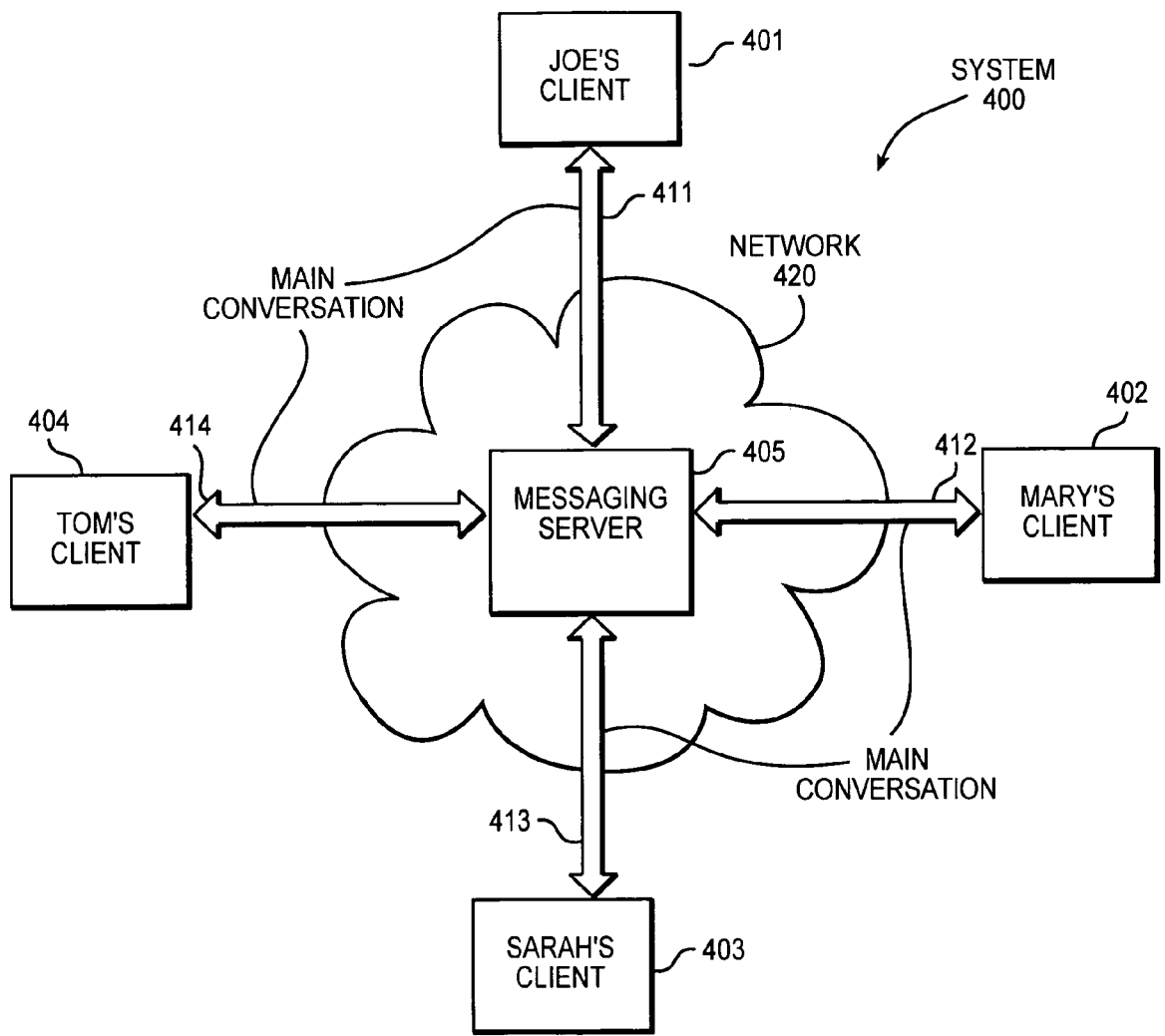
FIG. 4 is a block diagram illustrating an example of a messaging system or real-time communication system.

FIG. 4 is a block diagram illustrating an example of a messaging system or real-time communication system 400. Users of clients 401-404 may share a fold view (described in connection with FIG. 2B) in an instant-messaging conference (conference symbolized in FIG. 4 by "main conversation" arrows 411-414). In another scenario, users of clients 401-404 may share a fold view, where the users are collaborating on a document, which may be stored on server 405.

In the example in FIG. 4, clients 401-404 serve as means for receiving a text definition signal, and a signal for hiding. Referring again to FIGS. 2A-2B, for example, menu bar 210A displays and invokes, in response to user inputs, a main level of user commands. Menu bar 210A also invokes additional pull-down menus. A text definition signal, or a signal for hiding, or both, may be received through a user's selection of a menu item. These signals may be user event signals, such as mouse-button clicks or drags.

In the example in FIG. 4, clients 401-404 serve as means for displaying to users a text view and a clue as to what is hidden. Clients 401-404, server 405, and network 420 serve as means for sharing the text view. Clients 401-404 and server 405 may be implemented on a variety of hardware platforms (see FIG. 1 and its written description). Clients 401-404 may be implemented with hand-held wireless communications devices, notebook computers, personal computers, or workstations, for example.

Clients 401-404 and server 405 may be implemented with various software having messaging functions, such as software products sold under the trademarks LOTUS NOTES and LOTUS DOMINO by IBM, for example. Another implementation option is free, open-source software available under the trademark JABBER from Jabber Software Foundation. JABBER is well-suited for building custom functionality on top of the core protocols. Examples are described in an article by William Wright and Dana Moore, "Instant Messaging A Programmer's Tool? Jabber and Lightweight Languages Do the Trick," *Dr. Dobb's Journal*, pages 48-53, March 2004, herein incorporated by reference. The article examines the JABBER client-side protocol, and use of JABBER with various programming languages including Python, Perl, and Ruby. The JABBER protocol is described as "a bidirectional XML stream exchanged between the IM client and Jabber server."

In conclusion, we have shown examples of systems and methods that hide certain parts of a text to facilitate communication and organization. We have provided detailed examples involving instant messaging.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method of real-time, or near-real-time, communication in a network environment, said method comprising:
    defining one or more folding rules, wherein each folding rule specifies a condition for selection of a selected portion of text in an instant messaging conference having a plurality of participants;
    receiving a text definition signal, defining a first portion of text for folding based on an application of a folding rule from the one or more folding rules;

receiving a signal for applying the folding rule to the first portion of text;

in response to receiving said signal for applying the folding rule, generating a first text view of the instant messaging conference, without said first portion, and having, in the first text view, a clue as to content of the first portion of text that is hidden;

synchronizing the first text view of the instant messaging conference among each of the plurality of participants such that each of the plurality of participants views the instant messaging conference with a same first text view having the first portion of text hidden, wherein the clue includes a second portion of text, that is a sub-portion of the first portion of text, that is displayed in the first text view, and wherein the clue is selectable to re-display the first portion of text;

receiving a selection of the clue by one of the participants in the plurality of participants;

in response to receiving the selection of the clue, generating a second text view of the instant messaging conference with the first portion of text being displayed;

synchronizing the second text view of the instant messaging conference among each of the plurality of participants such that each of the plurality of participants views the instant messaging conference with the same second text view having the first portion of text displayed in response to receiving the selection of the clue; and in response to receiving the selection of the clue, automatically hiding a third portion of text in the second text view, different from the first and second portions of text, to thereby emphasize displaying of the first portion of text in the second text view.

2. The method of claim 1, wherein the folding rule specifies the selected portion of text to be text of the instant messaging conference having associated time information outside of a designated time range.

3. The method of claim 1, wherein the folding rule specifies the selected portion of text to be text of the instant messaging conference occurring in the instant messaging conference prior to a specified point in time.

4. The method of claim 1, wherein the folding rule specifies the selected portion of text to be text of the instant messaging conference occurring in the instant messaging conference prior to a period of inactivity of the instant messaging conference.

5. The method of claim 1, wherein the signal for applying the folding rule is received in response to a participant's ad hoc input to apply the folding rule to text of the instant messaging conference.

* * * * *